United States Patent
Carmichael

[19]

[11] Patent Number: 6,074,004
[45] Date of Patent: Jun. 13, 2000

[54] SEAT BACK FRAME FOR ABSORBING ENERGY

[76] Inventor: Donald Edwin Carmichael, 11508 Flowerwood Ct., Moorpark, Calif. 93021

[21] Appl. No.: 09/358,742

[22] Filed: Jul. 21, 1999

Related U.S. Application Data

[63] Continuation-in-part of application No. 09/026,241, Feb. 19, 1998, abandoned.

[51] Int. Cl.[7] .................................................. B60N 2/427
[52] U.S. Cl. .............................. 297/216.14; 297/216.13; 297/452.2
[58] Field of Search ........................... 297/216.1, 216.13, 297/216.4, 452.18, 452.2

[56] References Cited

U.S. PATENT DOCUMENTS

| | | |
|---|---|---|
| 3,537,751 | 11/1970 | Inoue et al. . |
| 3,574,307 | 4/1971 | Dove . |
| 4,349,167 | 9/1982 | Reilly . |
| 5,273,240 | 12/1993 | Sharon . |
| 5,295,729 | 3/1994 | Viano ................................. 297/216.14 |
| 5,320,308 | 6/1994 | Bilezikjian et al. . |
| 5,344,210 | 9/1994 | Marwan et al. . |
| 5,401,072 | 3/1995 | Farrand ........................... 297/216.14 X |
| 5,468,045 | 11/1995 | Weber ............................. 297/216.13 X |
| 5,669,661 | 9/1997 | Pajon . |
| 5,676,421 | 10/1997 | Brodsky . |
| 5,697,670 | 12/1997 | Husted et al. ...................... 297/216.13 |
| 5,716,102 | 2/1998 | Ray et al. ........................ 297/216.13 X |
| 5,769,489 | 6/1998 | Dallanno . |
| 5,836,647 | 11/1998 | Turman . |

*Primary Examiner*—Peter R. Brown
*Attorney, Agent, or Firm*—Oppenheimer Wolff & Donnelly, LLP

[57] ABSTRACT

The invention relates to a seat assembly capable of absorbing energy during a crash involving a series of impacts by providing a seat back which is relatively flexible to forward directed forces and relatively inflexible to aft directed forces. The seat back includes a seat back frame having a first and second side member. A first and second elongated member are flexible and have a first end, a second end, and a middle region between the first and second end. The elongated members are able to support a tensile load but are unable to support a compressive load. The first elongated member is disposed on a forward face of the first side member, wherein the first end is attached to a lower portion of the forward face, the second end is attached to an upper portion of the forward face, and the middle region is suspended. The second elongated member is disposed on a forward face of the second side member in a similar fashion. An aft directed force on the seat back frame tensions the elongated members such that the elongated members support the seat back frame, and a forward directed force on the seat back frame compresses the elongated members such that the elongated members are displaced and provide little or no support to the seat back frame.

30 Claims, 7 Drawing Sheets

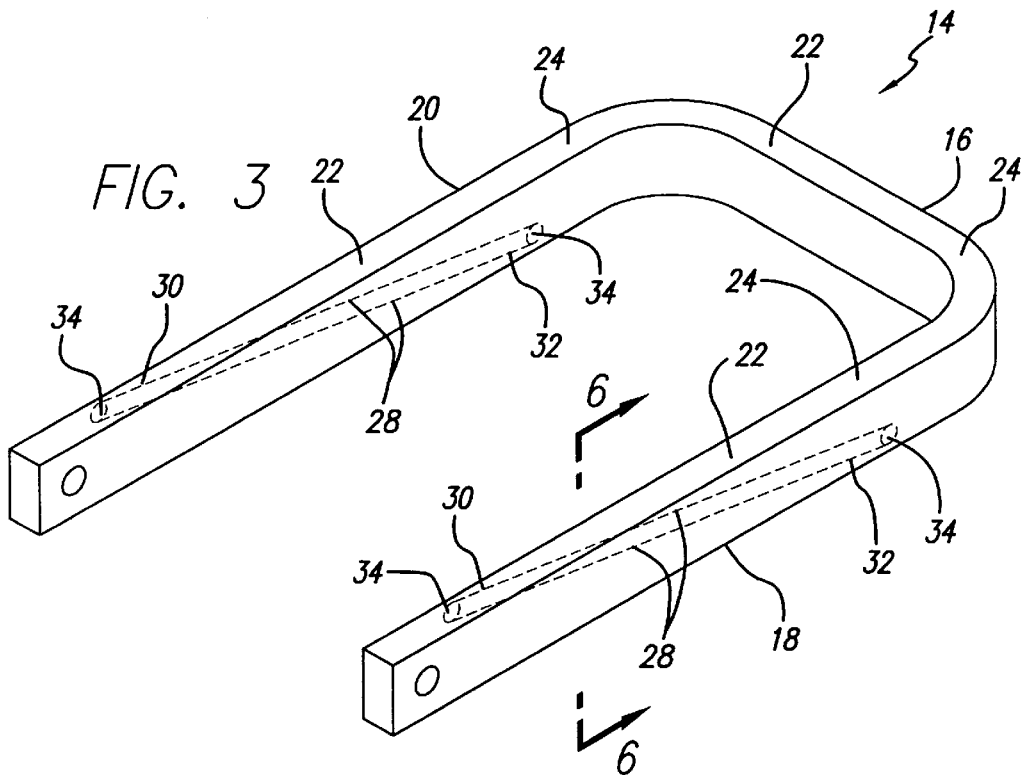
FIG. 3
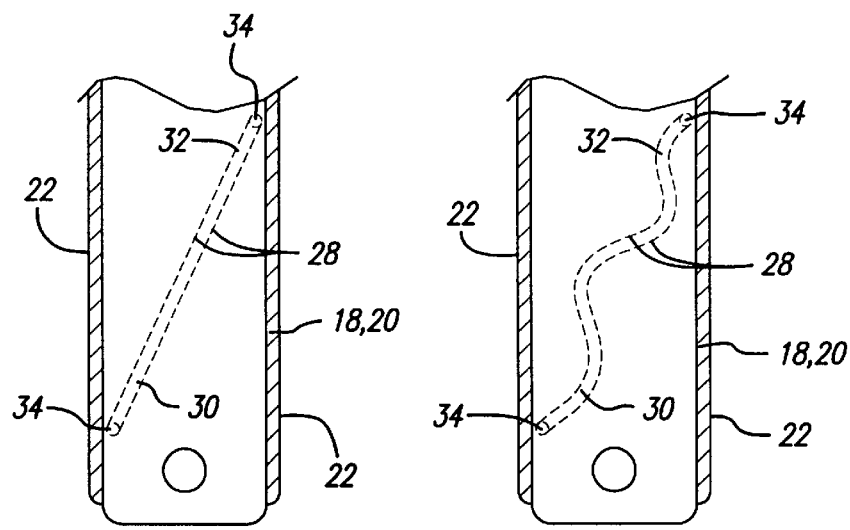
FIG. 4
FIG. 5

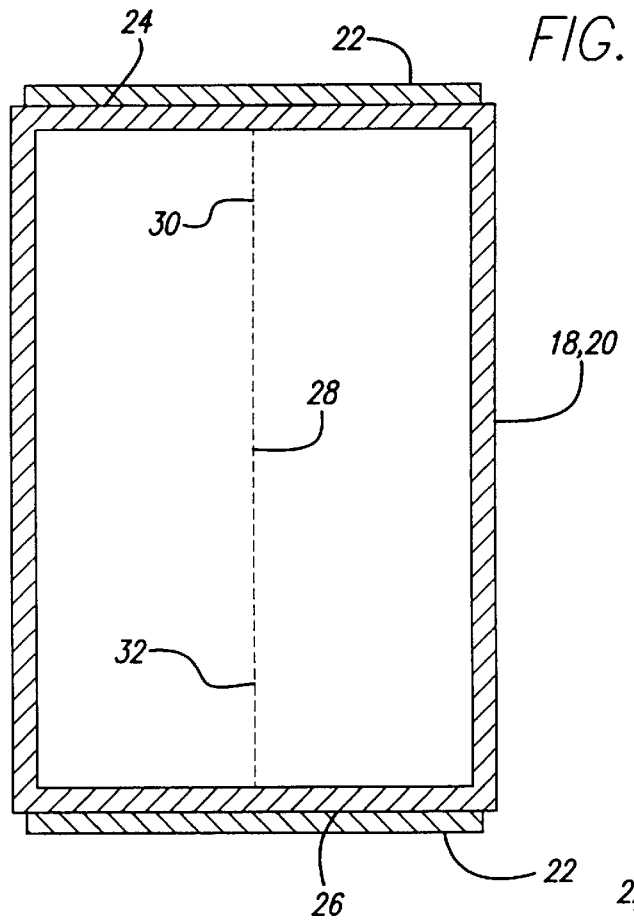
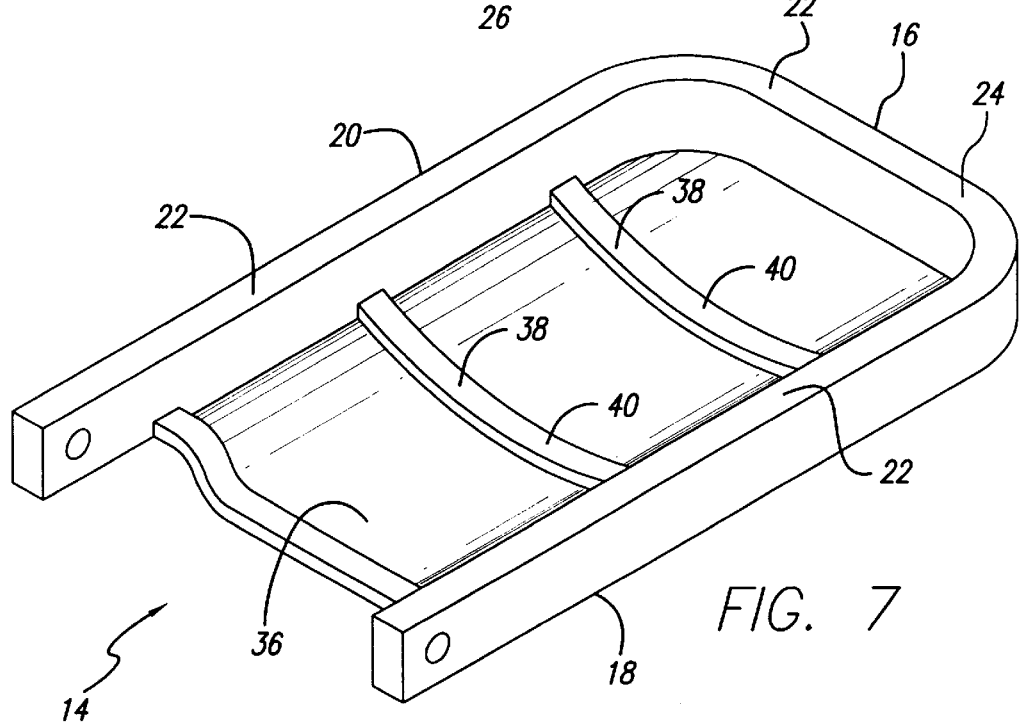

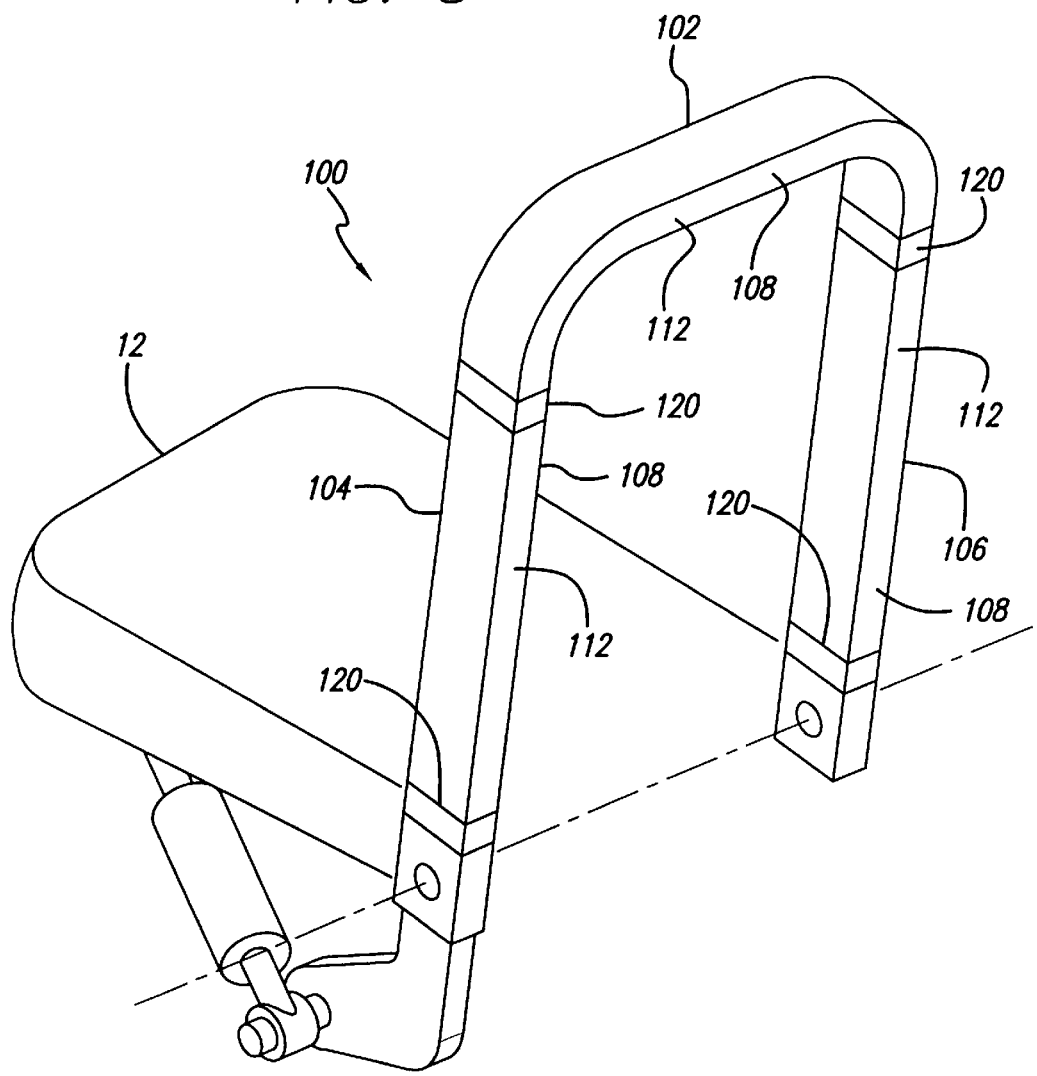

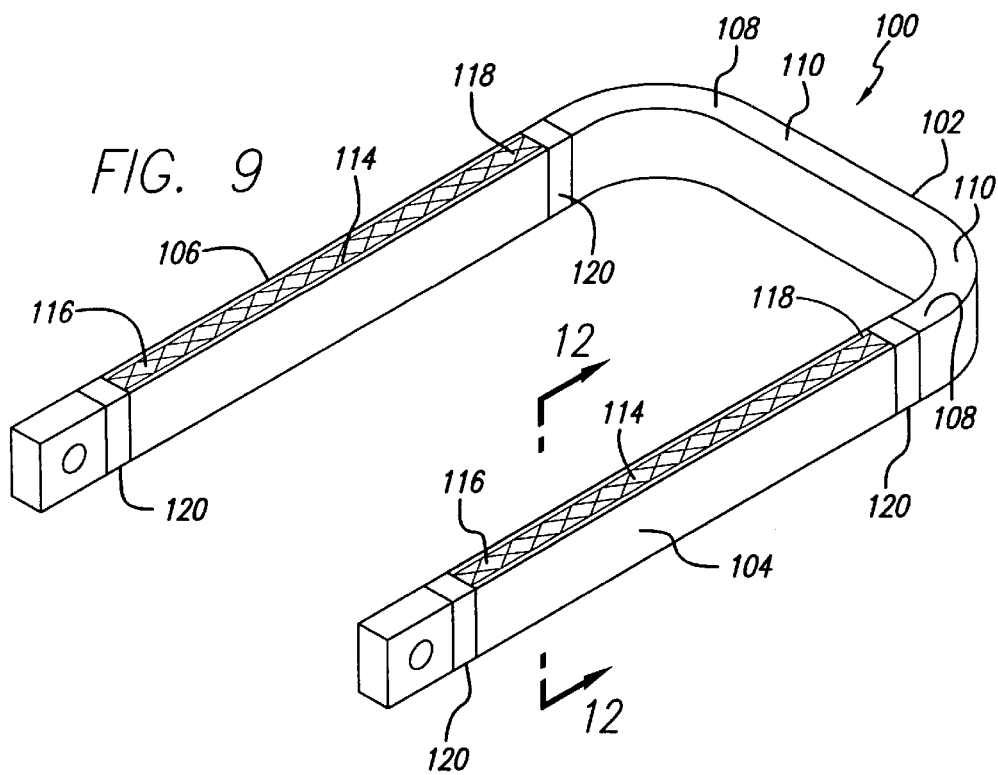
FIG. 9
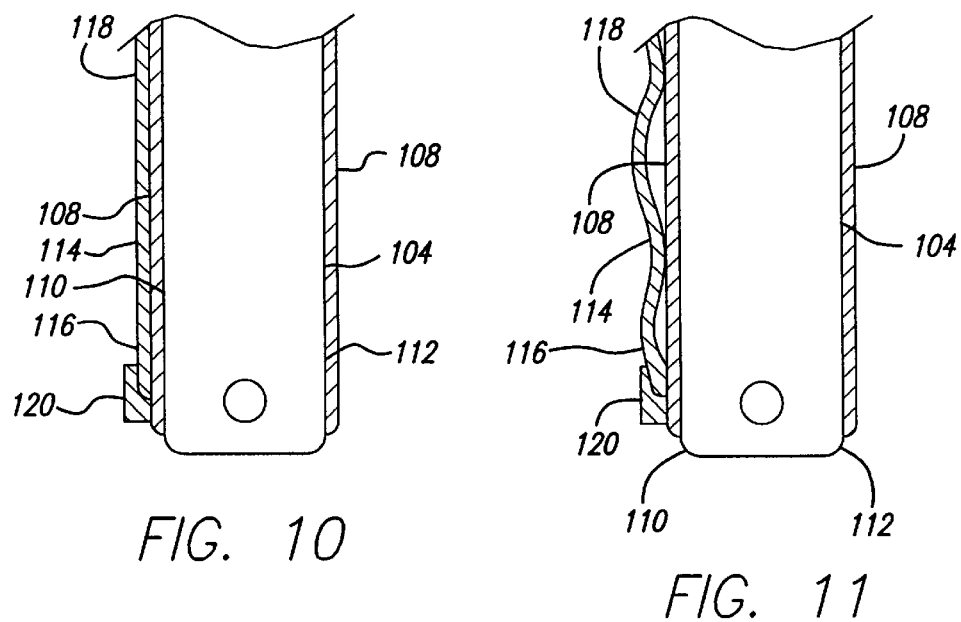
FIG. 10
FIG. 11

SEAT BACK FRAME FOR ABSORBING ENERGY

CROSS-REFERENCE TO RELATED APPLICATION

This is a continuation-in-part of application Ser. No. 09/026,241, filed Feb. 19, 1998 now abandoned. The entire content of this copending application is hereby incorporated by reference.

BACKGROUND OF THE INVENTION

This invention relates generally to the field of seating for aircraft, busses and trains, where multiple rows of seats are used and more particularly to a seat back frame for absorbing energy.

Passengers are generally seated in a forward facing fashion in aircraft, busses and trains. Most seats are arranged in rows of seats installed one row behind the other throughout the cabin. Most passengers face a seat back frame positioned directly in front. A safety hazard results from the typical restraint system utilized on the seats. Such restraint system usually include only a traditional lap belt and do not include an upper torso restraint such as a shoulder restraint. In the event of a high G forward crash, the head of the seat occupant is not restrained and is free to accelerate forward and violently strike the seat back frame located in front of the occupant.

At the time of a forward crash, a person's head strikes the seat back frame of a seat in the rows of seats located in front. It is obvious, however, that this impact cannot be avoided. Thus, any method to reduce the impact by absorbing or dissipating the energy is considered important.

In addition to absorbing impact energy, seats should be structurally strong, reliable and capable of positioning a passenger for comfort and safety for the duration of the trip. Under normal operating conditions, the entire seat configuration is subject to various loads and external forces, such as the weight and movement of an occupying passenger, or contact from others behind or near the seat.

A variety of seats designed to absorb and dissipate head impact energy exist in the prior art. Initially, seat backs were modified to absorb impact energy by padding the rear side of the seat back with materials such as a sponge rubber, semi-hard urethane foam, or pad materials such as cotton to the rear side of the seat back. To provide adequate protection, the thickness of the padding material substantially reduces the space available for passengers, and the seats become overly bulky.

A seat assembly described in U.S. Pat. No. 3,537,751 (Inoue et al.) provides for a somewhat less space consuming seat assembly. In the Inoue et al. patent, the seat has a seat back with a shock absorbing shell member. The shell member has a C-shaped cross section and is secured on a seat back frame in such a manner that a hollow shell space is placed in the direction in which the seat back is subject to a possible impact. The shell space withstands normal loads imposed on the seat back, and collapses when the seat back frame is subject to extreme loads such as impact resulting from a vehicle collision. Although the Inoue et al. patent allows the seat assembly to occupy less space, it is still preferable to have a back seat which is relatively thin to comfortably seat a maximum number of passengers in a vehicle.

The need to provide seat assemblies which are relatively light weight and require a relatively small of amount of space has been somewhat addressed by adding mechanical devices to the seat frame assembly to absorb and reduce the head impact load. Government agencies have established limits for the acceptable head injury criteria, i.e. HIC. Various approaches are presently utilized to absorb and dissipate the head impact energy. Most of the approaches are mechanical and require the deforming of materials or use of friction devices to function. One of the disadvantages of such approaches is that they do not perform adequately in crash condition involving multiple impacts.

For example, U.S. Pat. No. 5,676,421 (Brodsky) includes a seat with a plurality of shear pins which sequentially dissipate energy over a period of time. The energy absorption mechanism provides adjustable shear force and energy absorption based upon varying seat back angles. The shear pins sequentially shear to dissipate energy over time. However, the shear pins are unable to dissipate energy from subsequent impacts once they have been sheared.

U.S. Pat. No. 4,349,167 (Reily) describes an aircraft passenger seat having a plurality of integrally mounted wire-bending energy attenuators. Once deformed, the attenuators may not be adequately absorb the energy from subsequent impacts.

U.S. Pat. No. 5,344,210 (Marwa) describes an aircraft seat assembly having an elongated one piece element pivotally connected to front and rear seat supporting legs. The one piece element is crescent shaped with two curved arm portions of opposite convexities separated by a space arranged in a central portion of the crescent shape. During an impact, the one piece element is permanently deformed and may not be able to absorb energy from subsequent impacts.

U.S. Pat. No. 5,344,210 (Sharon) describes an aircraft seat movable between a first unloaded and a second crash induced position. During a crash induced movement of the seat, a deformable rod is pulled through a reducing die where the diameter of the rod is reduced, and the impact energy is absorbed as the rod is deformed. Since the rod is permanently deformed, the ability to absorb energy from subsequent impacts may be substantially reduced.

U.S. Pat. No. 5,320,308 (Bilezikjian et al.) describes an airline passenger seat having a shear pin which acts as a guide for the forward tilt rotation of a seat back. Integral with the seat back is a channel structure including restraining slots of a fixed length. The channel structure pivots about an arm member, and the slots "travel" along the shear pin. Under normal operation, once the seat back has rotated forward to a limited "forward tilt" position, the slots have traveled their full length and stop against the respective shear pins, which prevent further forward motion of the seat back. In the event of an excessive force acting on the seat back, such as impact from a passenger behind the seat back in a severe crash, the load is translated to the shear pins and the shear pins break off. The seat back rotates freely beyond the parameters defined by the slots, until restrained by the seat structure itself, a passenger therein, or the seat back in front of it. In addition, the fitting assembly includes a friction brake or clutch arrangement to inhibit tilting of the set back at all times but does not prevent the complete forward rotation of the seat back. The "brake-force" load needed to tilt the seat back is substantially less than the force required to shear the shear pins. Thus, once the shear pins break, the seat back is still capable of being placed in its fixed, non-tilting upright position. However, the passenger seats are unable to absorb energy from subsequent impacts because the shear pins are permanently sheared.

U.S. Pat. No. 5,340,059 (Kanigowski) describes an energy absorbing cabinet assembly attached to a rear wall of an aircraft cabin bulkhead and positioned directly in front of passengers sitting in front-row seats. The cabinet assembly includes a storage box unit with an airline-type foldable food table. Both the cabinet support structure and food table structure are made from energy absorbing materials and are capable of yielding and deforming under an impact from behind to protect the heads of front-row passengers during crash landing emergencies. However, the cabinet assembly is unsuited for protecting non front-row passengers seated behind seats.

Thus, there remains a need for an improved seat assembly which is capable of absorbing energy resulting from multiple crash impacts. In addition, there remains a need for a seat back which is relatively resistant to forces directed in the aft direction and yet relatively flexible to forwardly directed forces. Generally, seat comfort is substantially improved when the seat back is relatively rigid to support the passenger while sitting and reclining. Furthermore, there remains a need to provide an energy absorbing device which is relatively inexpensive and light weight.

SUMMARY OF THE INVENTION

It is an object of this invention to provide a seat assembly and method therefor that reduces impact resulting from a head of a person striking seat back frames of the row of seats in front during a forward crash.

It is another object of this invention to provide a seat assembly and method therefor that replaces existing mechanical devices (break over) commonly used to reduce the impact load from the head of a person striking the seat back frames of the row of seats in front during a forward crash.

It is a further object of this invention to provide a seat assembly and method therefor that reduces the impact load from the head of a person striking the seat back frames of the rows of seats in front during a forward crash without permanent deformation (bending or shearing) of materials.

It is yet another object of this invention to provide a seat assembly and method therefor that reduces the impact load from the head of a person striking the seat back frames of the row of seats in front during a forward crash when a second, third, and additional crash impacts occur.

It is still another object of this invention to provide a seat assembly and method thereof that includes a seat back which is relatively inflexible to loads directed in the aft direction to provide comfortable support for sitting and reclining and yet relatively flexible to loads directed in the forward direction for absorbing impact energy.

In accordance with the present invention, a seat assembly is provided with a seat back capable of absorbing impact loads resulting from a person striking the seat back. In particular, the seat back absorbs energy resulting from the head of the person striking the seat back during a forward crash. The seat assembly includes a hollow seat back frame made from energy absorbing composite materials. Internal fibers or metal wires are positioned diagonally within the frame along the longitudinal axis of the seat back frame. The lower end of the fibers or metal wires is secured to a forward and lower side of the seat back frame, and an upper end of the fibers or metal wires is secured to a substantially aft and upper side of the seat back frame. The fibers or metal wires increase the unidirectional stiffness of the seat back frame in the aft direction while providing little or no increase in stiffness in the forward direction. Thus, the seat back frame is relatively rigid in the aft direction to adequately support a person while sitting and reclining, and yet relatively flexible to forward directed forces in order to reduce the impact load from the head of a person striking the seat back frames of the row of seats in front during a forward crash. The seat back frame is sufficiently resilient and flexible to provide the absorption of energy feature without permanently deforming, and the internal fibers or metal wires have sufficient yield strength to withstand tensional forces resulting from a load. Thus, the seat assembly is capable of absorbing multiple impacts from a forward crash without permanent deformation of materials.

In a second embodiment, a seat assembly includes a hollow seat back frame having side tubes. Elongated members are disposed on a forward face of each of the side tubes. Each elongated member has a first end, a second end, and a middle region between the first and second end. Each elongated member is flexible and is able to support a tensile load and unable to support a compressive load. The lower and upper end of the elongated member are respectively anchored to the lower forward face and upper forward face of the side tube. The attachment may be further enhanced with a reinforcing band wrapped around the ends of the strap to prevent the strap from disbonding.

Other objects, features, and advantages of the present invention will become apparent from a consideration of the following detailed description. The drawings constitute a part of this specification and include exemplary embodiments to the invention which may be embodied in various forms. It is to be understood that in some instances various aspects of the invention may be shown exaggerated or enlarged to facilitate and understanding of the invention.

BRIEF DESCRIPTION OF THE DRAWINGS

FIG. 3 is a perspective view of the seat back frame shown in FIG. 2 having diagonally oriented fibers within the seat back frame;

FIG. 4 is a plan side view of a portion of the seat back frame shown in FIG. 2 illustrating the diagonal fibers in tension due to an aft sitting load applied to the seat back frame;

FIG. 5 is a plan side view of a portion of the seat back frame shown in FIG. 2 illustrating the diagonal fibers in deflection due to a forward load applied to the seat back frame;

FIG. 6 is cross-sectional view of the seat back frame along line 6—6 of FIG. 3;

FIG. 7 is a perspective view of the seat back frame shown in FIG. 2 further including a pan; and FIG. 8 is a perspective view of an alternative embodiment of a seat back frame pivotally attached to the base;

FIG. 9 is a perspective view of the seat back frame shown in FIG. 8;

FIG. 10 is a plan side view of a portion of the seat back frame shown in FIG. 9 illustrating a strap in tension due to an aft sitting load applied to the seat back frame;

FIG. 11 is a plan side view of a portion of the seat back frame shown in FIG. 9 illustrating the strap in deflection due to a forward load applied to the seat back frame;

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative for teaching one skilled in the art to employ the present invention in virtually any appropriately detailed system, structure or manner.

Figure 1:
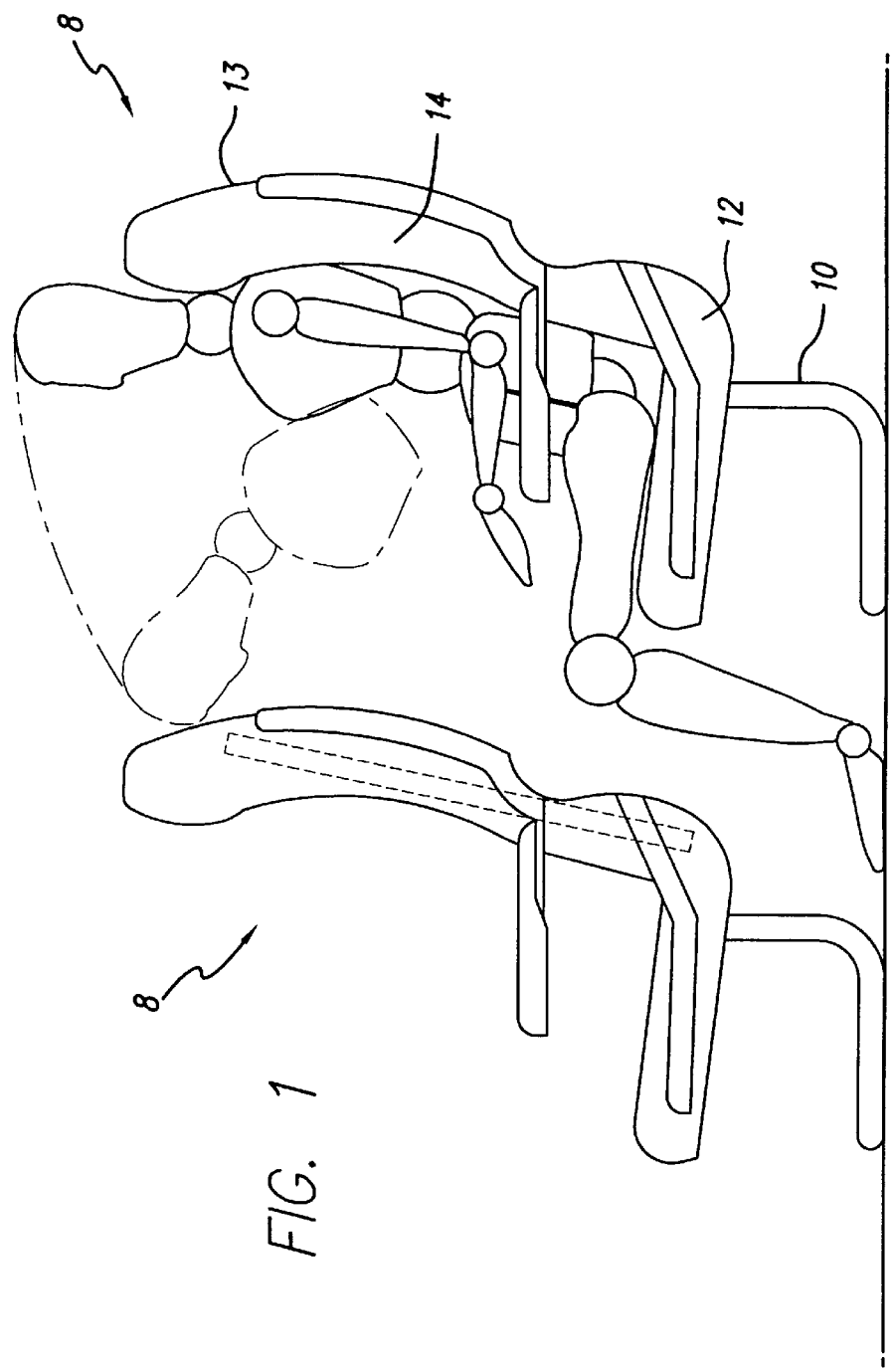
FIG. 1 is a side view of two seat assemblies of the present invention illustrating a head strike envelope of a passenger during a strong impact such as a crash landing.

Referring to FIG. 1, a seat assembly 8 of the present invention is arranged in a row-like fashion. The seat assembly 8 includes legs 10, a base 12, and a seat back 13. The legs 10 secure the base 12 of the seat assembly 8 to a floor of a vehicle such as an aircraft. The seat back 13 includes a seat back frame 14 which is pivotally connected to the base 12 to allow the seat back 13 to recline for passenger comfort. A passenger is secured to the seat assembly 8 by a lap type safety belt (not shown), and a safety hazard results in a forward crash from a passenger's head striking a back side of the seat back 13. A limit load is established by Federal regulations and specified by "head injury criteria" (HIC). The maximum acceptable level of HIC was arbitrarily set at 1000 units and is measured during qualification testing of new airline seats. Such qualification testing involves a dynamic simulation of a 16 G crash impact with use of test dummies. Dummy head accelerations are measured during testing and are inserted into a mathematical formula to arrive at the HIC value. In turn, this determines a qualification pass or fail criteria (with failure declared when HIC is over 1000 units). The HIC value can be reduced by dissipating the kinetic energy of impact.

One method of dissipating the kinetic energy of impact is by providing a seat back which is able to flex upon impact from a passenger. It has been determined that the HIC criteria can be met by designing a seat back which flexes about 4 inches in the forward direction during a 200 lb static load test. However, existing seat backs are limited to flex no more than 1 inch for ergonomic purposes, because a rigid seat back is more comfortable than a flexible seat back. Thus, seat backs which are structurally adequate to withstand an aft load condition resulting from a passenger sitting and reclining are overly rigid to adequately absorb the impact energy of a passenger impacting the seat back from behind in a severe crash condition. In order to protect the passenger seated behind a typical seat assembly, the seat assembly usually includes a mechanical device to absorb the crash impact of passenger's head striking the seat frame of the row of seats in front (passenger head strike). The mechanical devices presently used to absorb the head impact energy requires the deformation of materials and are not designed to function in crashes which include multiple impact conditions.

Figure 2:
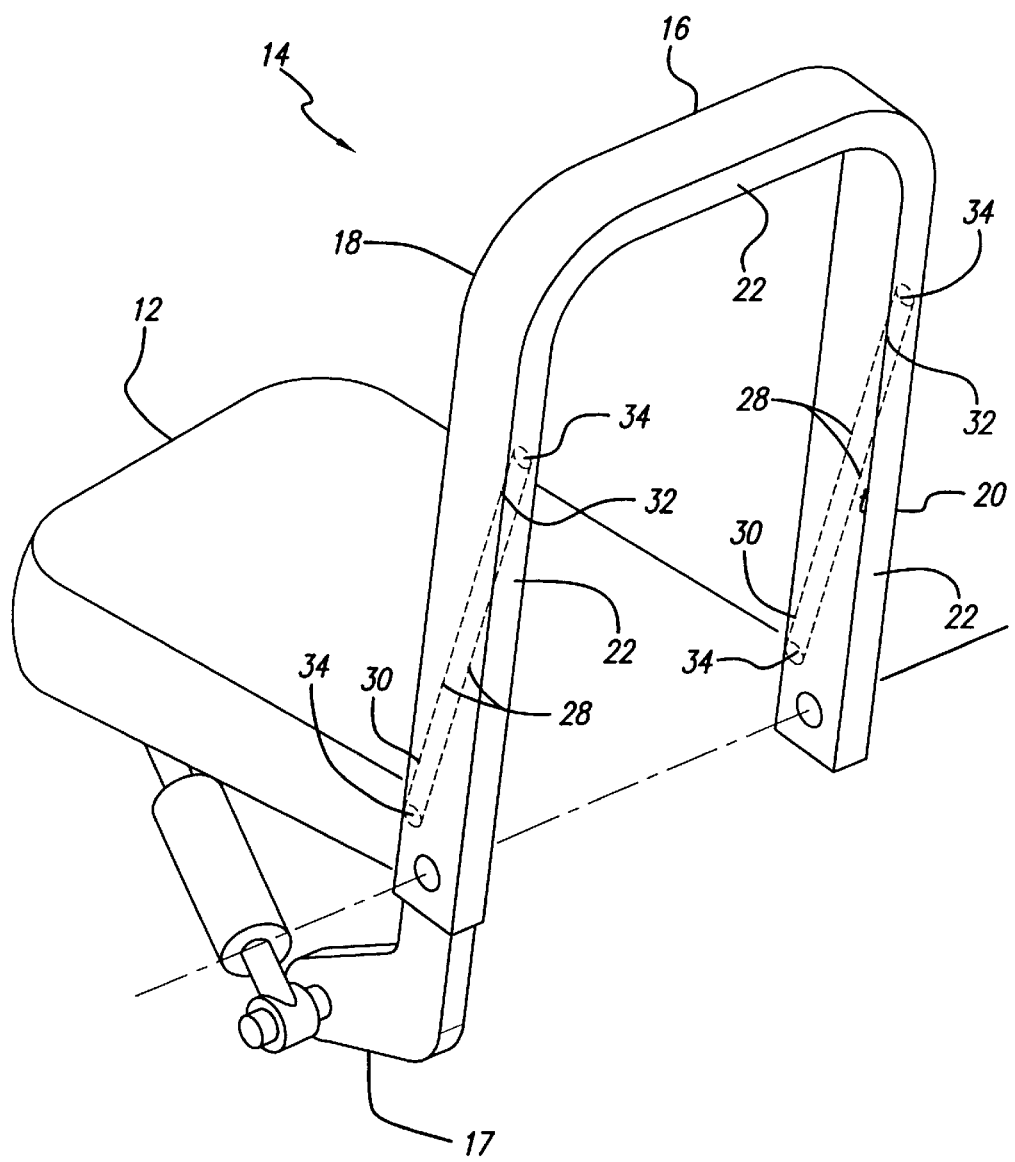
FIG. 2 is a perspective view of a portion of the seat assembly shown in FIG. 1 illustrating a seat back frame pivotally attached to a base.

Referring to FIGS. 2 and 6, the seat back frame 14 of the present invention is a substantially U-shaped member having an upper cross tube 16 and two side tubes 18, 20 extending from each end of the cross tube 16. The seat back frame 14 is about 27 inches in length and about 15 inches in width. The tubes 16, 18, 20 have a rectangular-shaped cross-section with a length of about 1.75 inches and a width of about 0.8 inch. The wall thickness t of the tubes 16, 18, 20 is about 0.04 inch. The seat back frame 14 further includes a pivot member 17.

The reaction load experienced by a passenger impacting the seat back 13 is reduced by having the seat back 13 capable of deflecting forward during a head crash impact, wherein the impact energy is transferred to deflecting the seat back 13. Because the seat back 13 is designed to deflect at much lower load levels than present seat backs, a greater amount of impact energy is absorbed. In the embodiment shown in FIG. 2, the seat back frame 14 is made from a composite comprising epoxy resin reinforced with carbon and glass fibers. After impact, the seat back 13 returns to its non-impact position to absorb energy from subsequent impacts. One advantage of using composites instead of conventional materials such as aluminum is that the composites have a higher strength to weight ratio. Typically, seat back frames formed from composites weigh 30% to 40% less than aluminum frames.

The tubes 16, 18, 20 are relatively flexible and have a relatively low elastic modulus. The tubes 16, 18, 20 comprise four plies of sheet material, wherein the sheet material include a first set of strips oriented parallel to each other, and a second set of strips oriented parallel to each other. The first set is laminated with the second strip and oriented 90° from the second set. As known to one skilled in the art, strips oriented parallel to a longitudinal axis of a tubing increase the bending resistance but do not appreciably increase the torsional resistance of the tubing, while strips oriented transversely to the longitudinal axis do not appreciably increase the bending resistance but do increase the torsional resistance. In order to obtain a seat back frame which is able to flex from an impact collision and also sufficiently resistant to torsional forces, the sheets are oriented +/−45° from the longitudinal axis of the tubes. The tubes 16, 18, 20 are formed by laying-up the sheets around a support mandrel, wherein the mandrel is removed at a later stage during the fabrication process.

With further reference to FIG. 6, the seat back frame 14 further includes caps 22 on the forward 24 and aft face 26 of the tubes 16, 18, 20 to increase the rigidity of the seat back frame 14 to forward and aft directed forces. The caps 22 include six plies of sheet material having epoxy resin reinforced with glass and carbon fibers. The sheet material is configured in a manner similar to the sheet material used in forming the tubes 16, 18, 20 with the exception that the sheet material for the caps 22 are oriented 0° and 90° from the longitudinal axis of the tubes 16, 18 20. The sheet material is laid-up on the forward 24 and aft face 26 of the tubes 16, 18, 20, wherein the width of the sheet is slightly less than the width of the forward 24 and aft face 26 of the tubes 16, 18, 20, wherein the width of the cap 22 is about 0.7 inch and the thickness is about 0.06 inch. The tube/cap assembly is placed in a hydraulic press molding which provides heat and pressure for final consolidation and cure of the composite. After consolidation and curing, the tube/cap assembly undergoes machining operations such as trimming, drilling, and routing.

The construction of the seat back frame 14 is not limited to the above description. For example, a second cross member may be oriented parallel to the first cross tube and joined to the bottom ends of the side tubes to strengthen the attachment of the seat back to the base of the seat assembly. Other types of composites which are suitable for the construction of the seat back frame include phenolic, thermoplastic, and similar resin systems reinforced with carbon, aramide, glass, and other suitable fibers known in the art. Furthermore, caps with fewer or more than six plies may be used, or the seat back frame made be configured without caps.

As shown in FIGS. 2 and 3, high tensile strength fibers (composite materials) 28 or metal wires are utilized to unidirectional increase the rigidity of the seat back frame 14. As used herein, the term "fibers" or "metal wires" are not strictly limited to fibers and wires, but also includes any elongated member which is capable of supporting a tensile load and yet unable to support a compressive load such as a cable, string, cord, and the like. The fibers 28 should have a high tensile and yield strength to reduce the likelihood of permanently deforming after a high tensile load. Preferably, the fibers 28 are formed from aramide, and the total diameter of the bundle of fibers 28 is about 0.3 inch. The fibers 28 are configured to increase the rigidity of the seat back frame 14 to aft loads by supporting the tubes while providing little or no increase in rigidity to forward loads. Thus, the seat back 13 is sufficiently rigid in the aft direction to comfortably support a sitting or reclining passenger, and is sufficiently flexible in the forward direction to absorb the impact energy from a passenger head strike.

With further reference to FIG. 3, the fibers 28 are located within the side tube 18, 20. The lower end 30 of the fibers 28 are attached to the forward face 24 and lower portion of the side tube 18, 20. The upper end 32 of the fibers 28 are attached to the aft face 26 and upper portion of the side tube such that the fibers 28 are oriented diagonally to the longitudinal axis of the side tube 18, 20. The ends 30, 32 of the fibers 28 may be anchored to the side tube 18, 20 by providing a hole 34 at each attachment site and feeding the end 30, 32 of the fibers 28 through the holes 34 and fixing the fibers 28 to the side tube 18, 20 with an adhesive such as an epoxy. It is noted that the fibers 28 may be anchored to the side tube 18, 20 by other means such as by mechanically clamping the ends of the fibers onto the side tube. The fibers may be attached to the side tube in a pre-loaded state by placing the fibers in tension before attaching the second end of the fibers to the side tube. However, the fibers doe not have to be pre-loaded to function properly.

FIG. 4 illustrates the fibers 28 being in tension due to an aft force directed at the seat back frame 14. As discussed previously, the aft directed loads are imposed on the seat back frame 14 when a passenger sits and reclines on the seat assembly 8. FIG. 5 illustrates the fibers 28 being in compression and displaced due to a forward force directed at the seat back frame 14.

It has been determined that a seat assembly 8 is considered comfortable for sitting purposes when the seat back 13 reflects no more than 1 inch in the aft direction when a passenger sits on the seat assembly 8. To simulate a typical passenger sitting on the seat assembly 8 of the present invention, the seat back 13 is placed in the "locked" position wherein one side tube 18 is pivotally locked and the other side tube 20 is free to pivotally rotate. During an aft load test, a 200 lb static load is directed to an upper corner region of the seat back 13 which is adjacent to the pivotally locked side tube 20, and the deflection is measured. Using this test procedure, it is contemplated that the seat back 13 will flex about 1 inch in the aft direction and about 4 inches in the forward direction. By providing a forward/aft stiffness ration of about 4 to 1, the energy from a passenger head impact is substantially absorbed by allowing the seat back frame 14 to deflect forward, and the seat back frame 14 is still adequately rigid to aft sitting loads for ergonomic purposes.

Referring to FIG. 7, the seat back frame 14 may also include a pan 36 to enhance the forward and aft deflection characteristics of the seat back 13 and to provide adequate back support for the passenger. The pan 36 may be formed from sheet material of unidirectional oriented material. The sheet material may be configured in a manner similar to the sheet material described previously in regards to the tubes 16, 18, 20 and caps 22. In order to obtain both bending and torsional rigidity, the sheet material is laid on the seat back frame 14 with strips oriented +/−45° from the longitudinal axis of the side tubes 16, 18, 20. The sheet material is formed on the tube/cap assembly using conventional lamination methods wherein the surface of the tube/cap assembly is covered with an adhesive such as an epoxy and a first sheet material is laid over the tube/cap assembly. The surface of the first sheet material is covered with the adhesive and a second sheet material is laid over the first sheet material. Additional sheet material may attached to the previous sheets if desired.

With further reference to FIG. 7, the strips comprise an epoxy resin reinforced with glass and aramide fibers. Other composites which may be used include phenolic and thermoplastic resins reinforced with glass, aramide, carbon, and other like fibers. The pan 36 may be further stiffened by forming transversely oriented channels 38 and/or depressions in the pan 36, and by adding reinforcing strips 40 of carbon fiber tape transversely across the pan 36.

Referring to FIG. 8, a second embodiment of a seat back frame 100 for the seat back assembly 8 of FIG. 1 is shown. The seat back frame 100 is pivotally connected to the base 12 to allow the seat back 13 to recline for passenger comfort. The seat back frame 100 is a substantially U-shaped member having a cross tube 102 and two side tubes 104 106 extending from each end of the cross tube 102. A pivot member 107 is attached to one of the side tubes 104. The seat back frame 100 also includes caps 108 on a forward 110 and aft face 112 of the tubes 102, 104, 106. The seat back frame 100 is dimensioned similarly to the previous embodiment, and the tubes 102, 104, 106 and caps 108 are configured in a similar manner. However, the rigidity of the seat back frame 100 is unidirectionally increased by high tensile strength straps 114 instead of fibers. The straps 114 are capable of supporting a tensile load and unable to support a compressive load. The straps 114 have a high tensile and yield strength to reduce the likelihood of permanently deforming under high load conditions such as a head impact collision. In the embodiment shown in FIG. 9, the straps 114 are formed from aramide filaments with a thermoplastic binder such as nylon. The straps 114 have a length of about 23 inches, a width of about 0.7 inch, and a thickness of about 0.1 inch.

Referring to FIGS. 8 and 9, the straps 114 are attached to the forward face 110 of the side tubes 104, 106. A lower 116 and upper end 118 of the straps 114 are anchored to the forward face 110 with a structural adhesive such as a thermosetting epoxy formulation. The attachment is further enhanced with a bonded reinforcing band 120 wrapped around the ends 116, 118 of the straps 114 to prevent the straps 114 from disbonding. The remaining portion of the straps 114, which is the region between the lower 116 and upper end 118, is not directly attached to the side tubes 104, 106 and is allowed to move relative to the forward face 110 of the side tubes 104,106. One of the advantages of securing the straps 114 without using holes is that the structural integrity of the side tubes 104, 106 is not weakened by forming holes. It is further noted that the unidirectional rigidity of the side tubes 104, 106 is further enhanced by positioning the straps 114 on the forward face 110 of the side tubes 104, 106 such that the longitudinal axis of the straps 114 is substantially parallel to the longitudinal axis of the side tubes 104, 106 rather than within and diagonal to the longitudinal axis of the side tubes 104, 106.

FIG. 10 illustrates the strap 114 being in tension due to an aft force directed at the seat back frame 100. As discussed previously, the aft directed loads are imposed on the seat back 13 when a passenger sits and reclines on the seat assembly 8. FIG. 11 illustrates the strap 114 being in compression and displaced due to a forward force directed at the seat back frame 100.

The bending stiffness (also known as flexural rigidity) of the seat back frame 100 may be characterized by calculating the product of the moment of inertia (I) and the modulus of elasticity (E) of the seat back frame 100. For the second embodiment, the aft/forward bending stiffness ratio is about 4.5 to 1. In addition, the aft deflection of the seat back frame 100 is calculated to be about 0.6 inch, and the forward deflection is calculated to be about 2.7 inches. The dimensions, moment of inertia (I), modulus of elasticity (E), and bending stiffness (E·I) of the seat back frame 100 is shown in Table 1.

The bending stiffness of the tubes 104, 106, caps 108 and straps 114 is given by:

bending stiffness$_{tube}$=$E_{tube}·I_{tube}$ bending stiffness$_{cap}$=$E_{cap}·I_{cap}$ bending stiffness$_{strap}$=$E_{strap}·I_{strap}$ The bending stiffness of the seat back frame 100 is the summation of the bending stiffness of the tubes 104, 106, caps 108, and straps 114. As shown in Table 1, the bending stiffness of the seat back frame 100 to an aft load is about 1.29 lb in$^2$, while the bending stiffness to a forward load is about 0.29 lb in$^2$. Thus, the aft/forward stiffness ratio is about 4.5 to 1.

Calculation of Forward/Aft Deflection

When a 200 lb static load is directed to the seat back frame 100, the expected deflection in the aft direction may be estimated by:

TABLE 1

| | | | | | Aft Load | | | Fwd Load | | |
|---|---|---|---|---|---|---|---|---|---|---|
| | d (in) | b (in) | t (in) | $t_1$ (in) | I (in) | E × 10$^6$ (psi) | EI × 10$^6$ lb in$^2$ | E × 10$^6$ (psi) | I (in) | Ei × 10$^6$ lb in$^2$ |
| Tube | 1.63 | 0.75 | 0.040 | 0.040 | 0.06276 | 1.50 | 0.0941 | 1.50 | 0.6276 | 0.0941 |
| Caps, d̄ | 1.69 | 0.75 | 0.060 | — | .06426 | 3.00 | 0.1928 | 3.0 | 0.06426 | 0.1928 |
| Strap, d̄/2 | 0.895 | 0.75 | 0.087 | — | 0.05220 | 19.20 | 1.0035 | — | — | — |
| Seat Back Frame | | | | | 0.17922 | | 1.2904 | | 0.12702 | 0.2869 |

Calculation of Forward/Aft Stiffness Ratio

Figure 12:
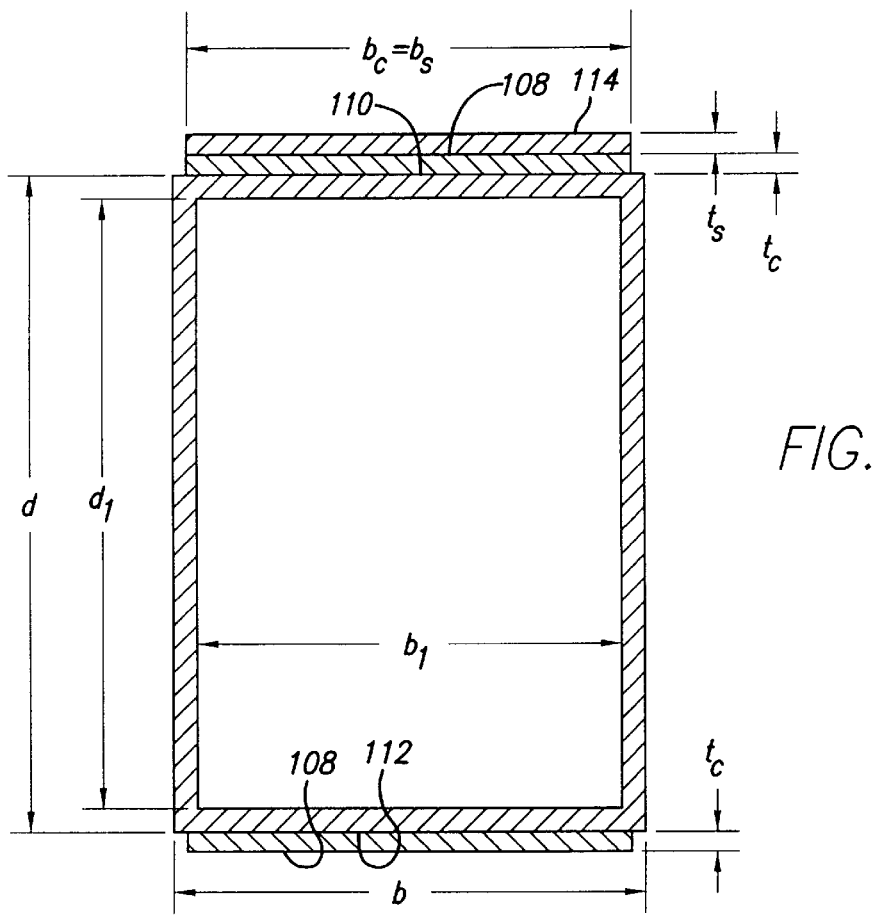
FIG. 12 is a cross-sectional view of the seat back frame along line 12—12 of FIG. 9.

Referring to FIG. 12, a cross-section of one of the side tubes 104, 106 is illustrated. When the seat back frame 100 is subjected to an aft directed load, the moment of inertia I(aft load) for the side tubes 104, 106, caps 108, and straps 114 is given by:

I(aft load)$_{tube}$=$bd^3/12-b_1d_1^3/12$ where b is the outer width of the side tubes 104, 106, $b_1$ is the inner width of the side tubes 104, 106, d is the outer depth of the side tubes 104, 106,; $d_1$ is the inner depth of the side tubes 104, 106

I(aft load)$_{cap}$=$b_c t_c·\bar{d}^2/2$ where $b_c$ is the width of the caps 108 (which is approximately equivalent to b the outer width of the side tubes 104, 106), $t_c$ is the thickness of the caps 108, and d̄ is the dimensional distance between the mid-planes of the caps 108; and I(aft load)$_{strap}$=$b_s t_s·(\bar{d}/2)^2$ where $b_s$ is the outer width of the straps 114 (which is approximately equivalent to b the outer width of the side tubes 104, 106), $t_s$ is the thickness of the straps 114, and d̄/2 is the dimensional distance between the mid-plane of the straps 114 and the mid-plane of the side tubes 104, 106.

The modulus of elasticity ($E_{tube}$, $E_{cap}$, and $E_{strap}$) for the side tubes 104, 106, caps 108, and straps 114 may be obtained from the *Airforce Advanced Composite Design Guide*. Due to the symmetry of the side tubes 104, 104 and caps 108, E(forward load)$_{tube}$ and E(forward load)$_{cap}$ are respectively equivalent to E(aft load)$_{tube}$ and E(forward load)$_{cap}$. E(forward load)$_{strap}$ is zero because the strap 114 is unable to support a compressive load.

y(aft load)=$PL^3/3E$(aft load)$I$(aft load)

where y(aft load) is the expected deflection in the aft direction, P is the load, L is the length of the side tubes 104, 106 which contribute to the stiffness of the seat back frame 100, E(aft load) is the modulus of elasticity for an aft load, and I(aft load) is the moment of inertia for an aft load. The expected deflection in the forward direction may be estimated by:

y(forward load)=$PL^3/3E$(forward load)$I$(forward load)

where y(forward load) is the expected deflection in the forward direction, P is the load, L is the length of the side tubes 104, 106 which contribute to the stiffness of the seat back frame 100, E(forward) is the modulus of elasticity for a forward load, and I(forward load) is the moment of inertia for a forward load. By applying the above formulas, y(aft load) is estimated to be about 0.6 inch, and y(forward load) is estimated to be about 2.7 inches. Thus, the aft/forward deflection ratio is about 1 to 4.5.

Figure 13:
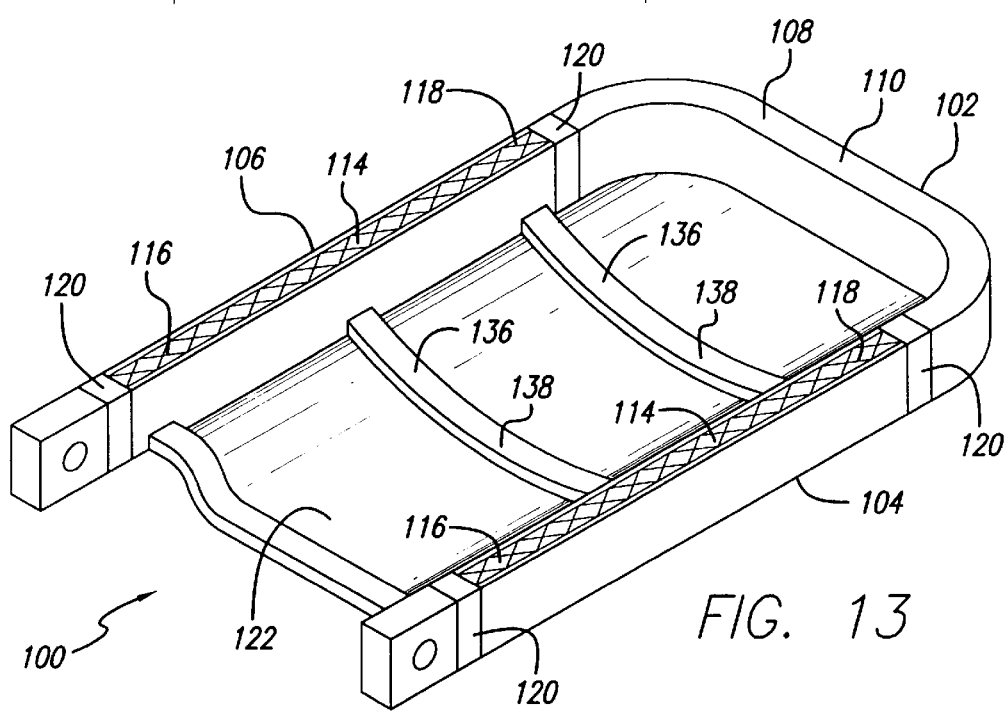
FIG. 13 is a perspective view of the seat back frame shown in FIG. 9 further including a pan.

Referring to FIG. 13, the seat back frame 100 may also include a pan 122 to provide adequate back support for the passenger. The pan 122 may be formed from sheet material of unidirectional oriented material. The sheet material may be configured in a manner similar to the sheet material described previously in regards to the tubes 102, 104, 106 and caps 108. The pan may be further stiffened by forming transversely oriented channels 136 and/or depressions in the pan 122, and by adding reinforcing strips 138 of carbon fiber tape transversely across the pan 122.

Although the present invention has been described in detail with regarding the exemplary embodiments and drawings thereof, it should be apparent to those skilled in the art that various adaptations may be accomplished without departing from the spirit and scope of the invention. For example, fibers may be used instead of straps for the second embodiment. Furthermore, the straps may be mechanically secured to the side tubes. Accordingly, the invention is not limited to the precise embodiment shown in the drawings and described in detail hereinabove.

What is claimed is:

1. A seat assembly for absorbing energy from a crash involving a series of impacts by providing a seat back having greater rigidity in an aft direction than in a forward direction, comprising:

a seat back frame having a first side member and a second side member, each of said side members having a hollow central region, said seat back frame structurally supporting said seat back; and a first elongated member and a second elongated member, each of said elongated members being flexible and having a first end, a second end, and a middle region between said first and second end, each of said elongated members being able to support a tensile load and unable to support a compressive load, wherein each of said elongated members is displaced under a compressive load;

said first elongated member being disposed in said hollow central region of said first side member, said first end of said first elongated member being anchored to a front and lower portion of said first side member, said second end of said first elongated member being anchored to an aft and upper portion of said first side member such that said first elongated member is oriented substantially diagonally to a longitudinal axis of said first side member, said central region of said first elongated member being suspended;

said second elongated member being disposed in said hollow central region of said second side member, said first end of said second elongated member being anchored to a front and lower portion of said second side member, and said second end of said second elongated member being anchored to an aft and upper portion of said second side member such that said second elongated member is oriented substantially diagonally to a longitudinal axis of said second side member;

wherein an aft directed force on said seat back frame tensions said elongated members such that said elongated members support said seat back frame; and wherein a forward directed force on said seat back frame compresses said elongated members such that said elongated members are displaced and provide little or no support to said seat back frame.

2. The seat assembly of claim 1, wherein said elongated members are fibers.

3. The seat assembly of claim 1, wherein said seat back frame is formed from a composite material.

4. The seat assembly of claim 3, wherein said seat back frame is substantially U-shaped and further comprises a cross member integrally formed with said first and second side member, said first side member being substantially parallel to said second side member.

5. The seat assembly of claim 4, wherein said composite material comprises epoxy resin reinforced with carbon and glass fibers.

6. The seat assembly of claim 1, further comprising a pan formed with said seat back frame, wherein said pan includes a first set of unidirectional tape oriented 45° from the longitudinal axis of said side members and a second set of unidirectional tape interwoven with said first set of unidirectional tape and oriented 90° from the longitudinal axis of said first set of unidirectional tape, said second set of unidirectional tape being oriented 45° from the longitudinal axis of said side members.

7. The seat assembly of claim 6, further including channels in said pan, said channels oriented transversely to a longitudinal axis of said side members for stiffening said pan.

8. The seat assembly of claim 7, wherein said pan further includes a plurality of reinforcing carbon tapes oriented transversely to the longitudinal axis of said side members for stiffening said pan.

9. The seat assembly of claim 1, further comprising:

a first pivot member having a hole at one end and attached to a bottom end of said first side member, wherein a portion of said first pivot member slidingly fits into said hollow central region of said first side member;

a second pivot member having a hole at one end and attached to a bottom end of said second side member, wherein a portion of said second pivot member slidingly fits into said hollow central region of said second member;

a base with a cylindrical shaft;

said seat back pivotally attached to said base, wherein said cylindrical shaft is fitted in said holes of said first and second member; and a plurality of legs attaching said base to a floor of a vehicle.

10. The seat assembly of claim 9, wherein said vehicle is an aircraft, said aircraft includes a plurality of said seat assemblies arranged in rows, wherein each of said seat backs of said plurality of seat assemblies is capable absorbing energy from multiple impacts by each of said seat back deflecting forward from a passenger head impact and returning to its non-impact position after the energy is absorbed, wherein each of said seat backs is capable of deflecting forward and absorbing energy from subsequent passenger head impacts.

11. The seat assembly of claim 1, wherein said seat back deflects more to aft directed loads than to forward directed loads, wherein said seat back is capable of absorbing impact energy from multiple impacts during a crash, wherein said seat back deflects in a forward direction from a forwardly directed impact load and returns to its non-loaded position when said forwardly directed impact load is dissipated such that said seat back is capable of absorbing impact energy from a subsequent impact by deflecting in a forward direction to a subsequent impact load.

12. The seat assembly of claim 1, wherein each of said elongated members has a length of about 23 inches and a diameter of about 0.3 inch.

13. A method of absorbing energy resulting from a passenger striking the back side of a seat assembly by providing a seat back having greater rigidity to aft directed forces than to forward directed forces, comprising the steps of:

providing the seat back with a first side member and a second side member, each of the side members having a hollow central region;

providing a first elongated member and a second elongated, each of the elongated members having a first end and a second end, each of the first and second elongated members being able to support a tensile load and unable to support a compressive load, wherein each of the elongated members being displaced under a compressive load;

positioning the first elongated member within the hollow central region of the first side member;

anchoring the first end of the first elongated member to a front and lower portion of the first side member;

anchoring the second end of the first elongated member to an aft and upper portion of the first side member;

positioning the second elongated member within the hollow central region of the second arm;

anchoring the first end of the second elongated member to a front and lower portion of the second side member;

tensioning the first elongated member upwardly and diagonally;

anchoring the second end of the second elongated member to an aft and upper portion of the second side member;

whereby an aft directed force on the seat back tensions the elongated members such that the elongated members support the seat back;

whereby a forward directed force resulting from a passenger striking the seat back during a crash compresses the elongated members such that the elongated members are displaced and provide little or no support to the seat back; and absorbing the impact energy from the passenger striking the seat back by allowing the seat back to flex forward;

whereby the seat back flexes substantially more to forward directed forces of a particular magnitude than to aft directed forces of equal magnitude.

14. The method of claim 13, wherein the first and second elongated members are fibers.

15. The method of claim 13, further comprising the step of integrally forming a cross member with the first and second side members, wherein the first side member is substantially parallel to the second side member, and wherein the seat back frame is substantially U-shaped.

16. A seat assembly for absorbing energy from a crash involving a series of impacts by providing a seat back having greater rigidity in an aft direction than in a forward direction, comprising:

a seat back frame having a first side member and a second side member, said seat back frame supporting said seat back;

a first elongated member and a second elongated member, each of said elongated members being flexible and having a first end, a second end, and a middle region between said first end and said second end, each of said elongated members being able to support a tensile load and unable to support a compressive load, wherein said elongated members are displaced under a compressive load;

said first elongated member disposed on a forward face of said first side member, said first end of said first elongated member attached to a lower portion of said forward face of said first side member, said second end attached to an upper portion of said forward face of said first side member, and said middle region of said first elongated member being suspended;

said second elongated member disposed on a forward face of said second side member, said first end of said second elongated member attached to a lower portion of said forward face of said second side member, said second end of said second elongated member attached to an upper portion of said forward face of said second side member, and said middle region of said middle region of said second elongated member being suspended;

wherein an aft directed force on said seat back frame tensions said first and second elongated member such that said first and second elongated members support said seat back frame; and wherein a forward directed force on said seat back frame compresses said elongated members such that said elongated members are displaced and provide little or no support to said seat back frame.

17. The seat assembly of claim 16, wherein said first and second elongated members are straps.

18. The seat assembly of claim 17, wherein said strap has a length of about 23 inches, a width of about 0.7 inch, and a thickness of about 0.1 inch.

19. The seat assembly of claim 16, wherein said seat back frame is formed from a composite material.

20. The seat assembly of claim 19, wherein said composite material comprises epoxy resin reinforced with carbon and glass fibers.

21. The seat assembly of claim 16, wherein said seat back frame is substantially U-shaped and further comprises a cross member integrally formed with said first and second side member, said first side member being substantially parallel to said second side member.

22. The seat assembly of claim 16, further comprising a pan formed with said seat back frame, wherein said pan includes a first set of unidirectional tape oriented 45° from a longitudinal axis of said side members and a second set of unidirectional tape interwoven with said first set of unidirectional tape and oriented 90° from a longitudinal axis of said first set of unidirectional tape, said second set of unidirectional tape being oriented 45° from the longitudinal axis of said side members.

23. The seat assembly of claim 22, further including channels in said pan, said channels oriented transversely to the longitudinal axis of said side members for stiffening said pan.

24. The seat assembly of claim 23, wherein said pan further includes a plurality of reinforcing carbon tapes oriented transversely to the longitudinal axis of said side members for stiffening said pan.

25. The seat assembly of claim 16, further comprising:

a first pivot member having a hole at one end and attached to a bottom end of said first side member, wherein a portion of said first pivot member slidingly fits into a hollow central region of said first side member;

a second pivot member having a hole at one end and attached to a bottom end of said second side member, wherein a portion of said second pivot member slidingly fits into a hollow central region of said second member;

a base with a cylindrical shaft;

said seat back pivotally attached to said base, wherein said cylindrical shaft is fitted in said holes of said first and second member; and a plurality of legs attaching said base to a floor of a vehicle.

26. A method of absorbing energy resulting from a passenger striking the back side of a seat assembly by providing a seat back having greater rigidity to aft directed forces than to forward directed forces, comprising the steps of:

providing the seat back with a first side member and a second side member;

providing a first elongated member and a second elongated member, each of elongated members being flexible and having a first end, a second end, and a middle region between said first end and said second end, each of the elongated members being able to support a tensile load and unable to support a compressive load, wherein each of the elongated members is displaced under a compressive load;

disposing the first elongated member on a forward face of the first side member, the first end of the first elongated member being attached to a lower portion of the forward face of the first side member, the second end being attached to an upper portion of the forward face of the first side member, and the middle region of the first elongated member being suspended; and disposing the second elongated member on a forward face of the second side member, the first end of the second elongated member being attached to a lower portion of the forward face of the second side member, the second end of the second elongated member being attached to an upper portion of the forward face of the second side member, and the middle region of the second elongated member being suspended;

whereby an aft directed force on the seat back frame tensions the elongated members such that the elongated members support the seat back frame; and whereby a forward directed force on the seat back frame compresses the elongated members such that the elongated members are displaced and provide little or no support to the seat back frame.

27. The method of claim 26, wherein the elongated members are straps.

28. The method of claim 27, wherein the straps are formed from aramide.

29. The method of claim 26, wherein each of the straps has a length of about 23 inches, a width of about 0.7 inch, and a thickness of about 0.1 inch.

30. The method of claim 26, further comprising the step of integrally forming a cross member with the first and second side members, whereby the first side member is substantially parallel to the second side member, and whereby the seat back frame is substantially U-shaped.

* * * * *